(12) United States Patent
Baek et al.

(10) Patent No.: US 9,998,959 B2
(45) Date of Patent: Jun. 12, 2018

(54) ELECTRONIC DEVICE AND METHOD FOR PROVIDING CALL SERVICES FOR THE SAME

(71) Applicant: Samsung Electronics Co., Ltd., Gyeonggi-do (KR)

(72) Inventors: Sunggi Baek, Daegu (KR); Jiyeon Lee, Gyeongsangbuk-do (KR); Jonghwa Choi, Jeollabuk-do (KR); Dongwoo Kim, Daegu (KR); Jinhong Seol, Gyeongsangbuk-do (KR); Changhwan Lee, Daegu (KR); Yonggil Han, Gyeongsangbuk-do (KR)

(73) Assignee: Samsung Electronics Co., Ltd (KR)

( * ) Notice: Subject to any disclaimer, the term of this patent is extended or adjusted under 35 U.S.C. 154(b) by 153 days.

(21) Appl. No.: 14/662,883

(22) Filed: Mar. 19, 2015

(65) Prior Publication Data
US 2015/0282012 A1 Oct. 1, 2015

(30) Foreign Application Priority Data

Mar. 25, 2014 (KR) ........................ 10-2014-0034931

(51) Int. Cl.
*H04W 36/00* (2009.01)
*H04L 29/06* (2006.01)
*H04W 4/16* (2009.01)

(52) U.S. Cl.
CPC ..... *H04W 36/0022* (2013.01); *H04L 65/1006* (2013.01); *H04L 65/1069* (2013.01); *H04L 65/1076* (2013.01); *H04W 4/16* (2013.01)

(58) Field of Classification Search
CPC ............ H04W 36/0022; H04W 4/16; H04L 65/1076; H04L 65/1069
See application file for complete search history.

(56) References Cited

U.S. PATENT DOCUMENTS

2010/0098023 A1* 4/2010 Aghili ............... H04W 36/0022
370/331
2010/0329244 A1* 12/2010 Buckley .............. H04W 76/026
370/352

(Continued)

FOREIGN PATENT DOCUMENTS

| KR | 1020130119128 | 10/2013 |
| KR | 1020140011624 | 1/2014 |

OTHER PUBLICATIONS

RFC 3261, SIP: Session Initiation Protocol, IEEE Network Working Group, by J. Rosenberg, et al., Jun. 2002 (Section 21).*

*Primary Examiner* — Albert T Chou
(74) *Attorney, Agent, or Firm* — The Farrell Law Firm, P.C.

(57) ABSTRACT

A method of providing call services for an electronic device is provided. The method may include receiving a call request from the user; determining whether the call request is a request for a call via an Internet Protocol (IP) Multimedia System (IMS) network; making, when it is determined that the call request is a request for a call via an IMS network, an attempt to set up the call via the IMS network; determining whether the attempt for the call setup via the IMS network is successful; and performing Circuit Switched Fallback (CSFB) when it is determined that the attempt for the call setup via the IMS network is unsuccessful.

19 Claims, 10 Drawing Sheets

(56) References Cited

U.S. PATENT DOCUMENTS

| | | | | |
|---|---|---|---|---|
| 2015/0003342 A1* | 1/2015 | Swaminathan | ....... | H04W 88/06 370/329 |
| 2015/0282011 A1* | 10/2015 | Watfa | ................ | H04W 36/0022 370/332 |
| 2015/0296420 A1* | 10/2015 | Drevon | ................ | H04W 48/18 455/436 |

\* cited by examiner

ELECTRONIC DEVICE AND METHOD FOR PROVIDING CALL SERVICES FOR THE SAME

PRIORITY

This application claims priority under 35 U.S.C. § 119(a) to a Korean Patent Application filed on Mar. 25, 2014 in the Korean Intellectual Property Office and assigned Serial No. 10-2014-0034931, the entire content of which is incorporated herein by reference.

BACKGROUND

1. Field of the Invention

The present invention generally relates to an electronic device and method for providing call services that enable stable delivery of call services.

2. Description of the Related Art

A Long Term Evolution (LTE) network may provide Voice over LTE (VoLTE) service, which is a voice service using packet switching (PS). Hence, an LTE-enabled electronic device may support a voice call service based on packet switching in an LTE coverage area.

In the case of the VoLTE service using an LTE network, when a network error occurs or the data service is unstable, an electronic device may fail to provide basic voice call and supplementary services.

SUMMARY

The present invention has been made to solve at least the above-mentioned problems and/or disadvantages and to provide at least the advantages described below.

Accordingly, an aspect of the present invention is to provide an electronic device and method for providing call services, when a voice call service like VoLTE using an LTE network is unstable, Circuit Switched Fallback (CSFB) is automatically performed so as to achieve stable delivery of a voice call service.

In accordance with an aspect of the present invention, a method of providing call services for an electronic device is provided. The method includes receiving a call request from a user; determining whether the call request is a request for a call via an Internet Protocol (IP) Multimedia System (IMS) network; making, when it is determined that the call request is a request for a call via an IMS network, an attempt to set up the call via the IMS network; determining whether the attempt for the call setup via the IMS network is successful; and performing Circuit Switched Fallback (CSFB) when it is determined that the attempt for the call setup via the IMS network is unsuccessful.

In accordance with another aspect of the present invention, an electronic device is provided. The electronic device includes an input unit configured to receive a call request from a user; a communication module configured to connect to a network via a base station (eNodeB); and a control unit configured to determine, upon receiving the call request, whether the call request is a request for a call via an IMS network, to control, when it is determined that the call request is a request for a call via an IMS network, the communication module to set up the call via the IMS network, and to perform CSFB when the call setup via the IMS network is unsuccessful.

BRIEF DESCRIPTION OF THE DRAWINGS

The above and other aspects, features, and advantages of certain embodiments of the present invention will be more apparent from the following detailed description, taken in conjunction with the accompanying drawings, in which.

DETAILED DESCRIPTION OF EMBODIMENTS OF THE PRESENT INVENTION

Figure 1:
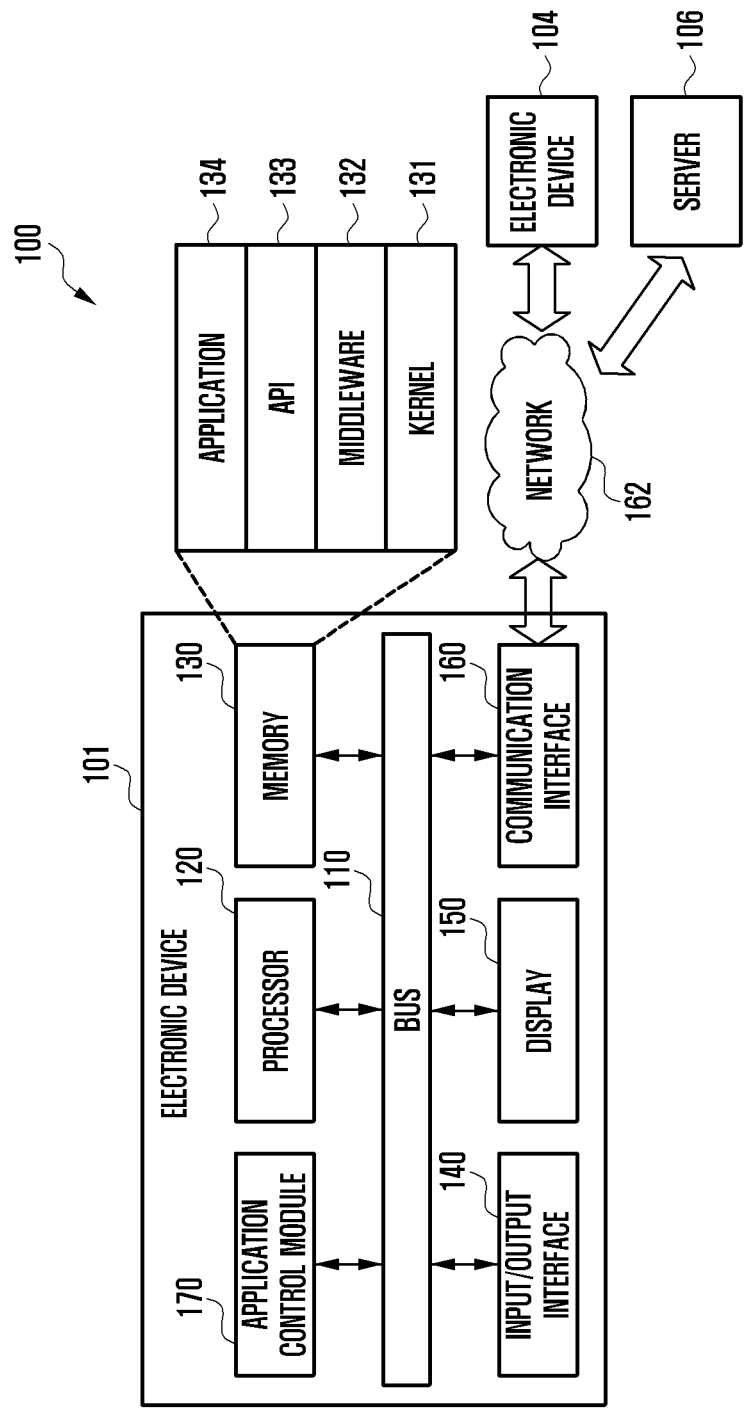
FIG. 1 illustrates a configuration of a network environment including electronic devices according to an embodiment of the present invention.

The following description with reference to the accompanying drawings is provided to assist in a comprehensive understanding of various embodiments of the present invention as defined by the claims and their equivalents. It includes various specific details to assist in that understanding but these are to be regarded merely as examples. Accordingly, those of ordinary skill in the art will recognize that various changes and modifications of the embodiments described herein can be made without departing from the scope and spirit of the present invention. In addition, descriptions of well-known functions and constructions may be omitted for clarity and conciseness.

The terms and words used in the following description and claims are not limited to their meanings in a dictionary, but are merely used to enable a clear and consistent understanding of the present invention. Accordingly, it should be apparent to those skilled in the art that the following description of various embodiments of the present invention is provided for illustration purposes only and not for the purpose of limiting the present invention as defined by the appended claims and their equivalents.

As used herein, the singular forms "a", "an", and "the" are intended to include the plural forms, including "at least one", unless the content clearly indicates otherwise. The term "or" means "and/or". As used herein, the term "and/or" includes any and all combinations of one or more of the associated listed items. It will be further understood that the terms "comprises" and/or "comprising", or "includes" and/ or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that, although the terms "first", "second", "third", and the like, may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings herein.

In various embodiments of the present invention, an electronic device may be a device that involves a communication function. For example, an electronic device may be a smart phone, a tablet PC (Personal Computer), a mobile phone, a video phone, an e-book reader, a desktop PC, a laptop PC, a netbook computer, a PDA (Personal Digital Assistant), a PMP (Portable Multimedia Player), an MP3 player, a portable medical device, a digital camera, or a wearable device (e.g., an HMD (Head-Mounted Device) such as electronic glasses, electronic clothes, an electronic bracelet, an electronic necklace, an electronic appcessory, or a smart watch).

According to some embodiments of the present invention, an electronic device may be a smart home appliance that involves a communication function. For example, an electronic device may be a TV, a DVD (Digital Video Disk) player, audio equipment, a refrigerator, an air conditioner, a vacuum cleaner, an oven, a microwave, a washing machine, an air cleaner, a set-top box, a TV box (e.g., Samsung HomeSync™, Apple TV™, Google TV™, etc.), a game console, an electronic dictionary, an electronic key, a camcorder, or an electronic picture frame.

According to some embodiments of the present invention, an electronic device may be a medical device (e.g., Magnetic Resonance Angiography (MRA), Magnetic Resonance Imaging (MRI), Computed Tomography (CT), ultrasonography, etc.), a navigation device, a Global Positioning System (GPS) receiver, an Event Data Recorder (EDR), an Flight Data Recorder (FDR), a car infotainment device, electronic equipment for ship (e.g., a marine navigation system, a gyrocompass, etc.), avionics, security equipment, or an industrial or home robot.

According to some embodiments of the present invention, an electronic device may be furniture or part of a building or construction having a communication function, an electronic board, an electronic signature receiving device, a projector, or various measuring instruments (e.g., a water meter, an electric meter, a gas meter, a wave meter, etc.). An electronic device disclosed herein may be one of the above-mentioned devices or any combination thereof. As well understood by those skilled in the art, the above-mentioned electronic devices are examples only and not to be considered as a limitation of this invention.

The following description of various embodiments of present invention is focused on the Third Generation Partnership Project (3GPP) LTE system. However, it should be apparent to those skilled in the art that the subject matter of the present invention is also applicable to other communication/computer systems having a similar technical background and configurations without significant modification. For example, techniques targeted for the LTE system may also be applied to the Universal Mobile Telecommunications System (UMTS) Terrestrial Radio Access Network (UTRAN)/Global System for Mobile communications (GSM) EDGE Radio Access Network (GERAN) system having similar configurations. In this case, the ENodeB (Radio Access Network (RAN) node) may be replaced with the Radio Network Controller (RNC)/Base Station Controller (BSC), the Serving Gateway (S-GW) may be omitted or be included in the Serving General Packet Radio Service (GPRS) Support Node (SGSN), and the Packet Data Network (PDN) Gateway (P-GW) may correspond to the Gateway GPRS Support Node (GGSN). The bearer of the LTE system may correspond to the Packed Data Protocol (PDP) context of the UTRAN/GERAN system.

In an embodiment of the present invention, to reduce a system load due to congestion information, user plane data is utilized to exchange congestion information instead of control plane signaling. Here, the user plane data may include user data packets exchanged between user equipment and a PDN, and header information for transmission thereof.

In a feature of the present invention, the electronic device and method for providing call services may determine whether to perform Circuit Switched Fallback (CSFB) according to the result of operations for a voice call service and related supplementary service.

The electronic device and method for providing call services may determine the possibility to perform CSFB on a network.

In the electronic device and method for providing call services for the same, when a voice call service like VoLTE using an LTE network is unstable, Circuit Switched Fallback (CSFB) is automatically performed, achieving stable delivery of a voice call service.

FIG. 1 is a block diagram illustrating a configuration of a network environment 100 including an electronic device 101 in accordance with an embodiment of the present invention. Referring to FIG. 1, the electronic device 101 includes, but not limited to, a bus 110, a processor 120, a memory 130, an input/output interface 140, a display 150, a communication interface 160, and an application control module 170.

The bus 110 is a circuit designed for connecting the above-discussed elements and communicating data (e.g., a control message) between such elements.

The processor 120 receives commands from the other elements (e.g., the memory 130, the input/output interface 140, the display 150, the communication interface 160, or the application control module 170, etc.) through the bus 110, interprets the received commands, and performs the arithmetic or data processing based on the interpreted commands.

The memory 130 stores therein commands or data received from or created at the processor 120 or other elements (e.g., the input/output interface 140, the display 150, the communication interface 160, or the application control module 170, etc.). The memory 130 may include programming modules such as a kernel 131, a middleware 132, an application programming interface (API) 133, and an application 134. Each of the programming modules may be composed of software, firmware, hardware, and any combination thereof.

The kernel 131 controls or manages system resources (e.g., the bus 110, the processor 120, or the memory 130, etc.) used for performing operations or functions of the other programming modules, e.g., the middleware 132, the API 133, or the application 134. Additionally, the kernel 131 offers an interface that allows the middleware 132, the API 133, or the application 134 to access, control, or manage individual elements of the electronic device 101.

The middleware 132 performs intermediation by which the API 133 or the application 134 communicates with the kernel 131 to transmit or receive data. Additionally, in connection with task requests received from the application 134, the middleware 132 performs control (e.g., scheduling or load balancing) for the task requests by using technique such as assigning the priority for using a system resource of the electronic device 101 (e.g., the bus 110, the processor 120, or the memory 130, etc.) to at least one application 134.

The API 133, which is an interface for allowing the application 134 to control a function provided by the kernel 131 or the middleware 132, may include, for example, at least one interface or function (e.g., a command) for file control, window control, image processing, text control, and the like.

According to an embodiment of the present invention, the application 134 may include a Short Message Service (SMS)/Multimedia Messaging Service (MMS) application, an email application, a calendar application, an alarm application, a health care application (e.g., an application for measuring the quantity of motion or blood sugar), an environment information application (e.g., an application for offering information about atmospheric pressure, humidity, or temperature, etc.), and the like. Alternatively, the application 134 may be an application associated with an exchange of information between the electronic device 101 and any external electronic device (e.g., an external electronic device 104). This type application may include a notification relay application for delivering specific information to an external electronic device, or a device management application for managing an external electronic device.

For example, the notification relay application may include a function to deliver notification information created at any other application of the electronic device 101 (e.g., the SMS/MMS application, the email application, the health care application, or the environment information application, etc.) to an external electronic device (e.g., the electronic device 104). Alternatively, the notification relay application may receive notification information from an external electronic device (e.g., the electronic device 104) and offer it to a user. The device management application may manage (e.g., install, remove or update) a certain function (a turn-on/turn-off of an external electronic device (or some components thereof), or adjustment of brightness (or resolution) of a display) of any external electronic device (e.g., the electronic device 104) communicating with the electronic device 101, a certain application operating at such an external electronic device, or a certain service (e.g., a call service or a message service) offered by such an external electronic device.

According to an embodiment of the present invention, the application 134 may include a specific application specified depending on attributes (e.g., a type) of an external electronic device (e.g., the electronic device 104). For example, in case an external electronic device is a Moving Picture Experts Group (MPEG) Audio Layer 3 (MP3) player, the application 134 may include a specific application associated with a play of music. Similarly, in case an external electronic device is a portable medical device, the application 134 may include a specific application associated with a health care. In an embodiment of the present invention, the application 134 may include at least one of an application assigned to the electronic device 101 or an application received from an external electronic device (e.g., a server 106 or the electronic device 104).

The input/output interface 140 delivers commands or data, entered by a user through an input/output unit (e.g., a sensor, a keyboard, or a touch screen), to the processor 120, the memory 130, the communication interface 160, or the application control module 170 via the bus 110. For example, the input/output interface 140 may offer data about a user's touch, entered through the touch screen, to the processor 120. Also, through the input/output unit (e.g., a speaker or a display), the input/output interface 140 outputs commands or data, received from the processor 120, the memory 130, the communication interface 160, or the application control module 170 via the bus 110. For example, the input/output interface 140 may output voice data, processed through the processor 120, to a user through the speaker.

The display 150 displays thereon various kinds of information (e.g., multimedia data, text data, etc.) to a user.

The communication interface 160 performs a communication between the electronic device 101 and any external electronic device (e.g., the electronic device 104 of the server 106). For example, the communication interface 160 may communicate with any external device by being connected with a network 162 through a wired or wireless communication. A wireless communication may include, but not limited to, at least one of Wireless Fidelity (WiFi), Bluetooth (BT), Near Field Communication (NFC), Global Positioning System (GPS), or a cellular communication (e.g., LTE, LTE Advanced (LTE-A), Code Division Multiple Access (CDMA), Wideband CDMA (WCDMA), UMTS, Wireless Broadband (WiBro), or GSM, etc.). A wired communication may include, but not limited to, at least one of Universal Serial Bus (USB), High Definition Multimedia Interface (HDMI), Recommended Standard 232 (RS-232), or Plain Old Telephone Service (POTS).

According to an embodiment of the present invention, the network 162 is a communication network, which may include at least one of a computer network, the Internet, an Internet of Things, or a telephone network. According to an embodiment of the present invention, a protocol (e.g., transport layer protocol, data link layer protocol, or physical layer protocol) for a communication between the electronic device 101 and any external device may be supported by at least one of the application 134, the API 133, the middleware 132, the kernel 131, or the communication interface 160.

The application control module 170 processes at least part of information obtained from the other elements (e.g., the processor 120, the memory 130, the input/output interface 140, or the communication interface 160, etc.) and then offers it to a user in various ways. For example, the application control module 170 may recognize information about access components equipped in the electronic device 101, store such information in the memory 130, and execute the application 134 on the basis of such information. A further description about the application control module 170 will be given hereinafter through FIGS. 2 to 10.

Figure 2:
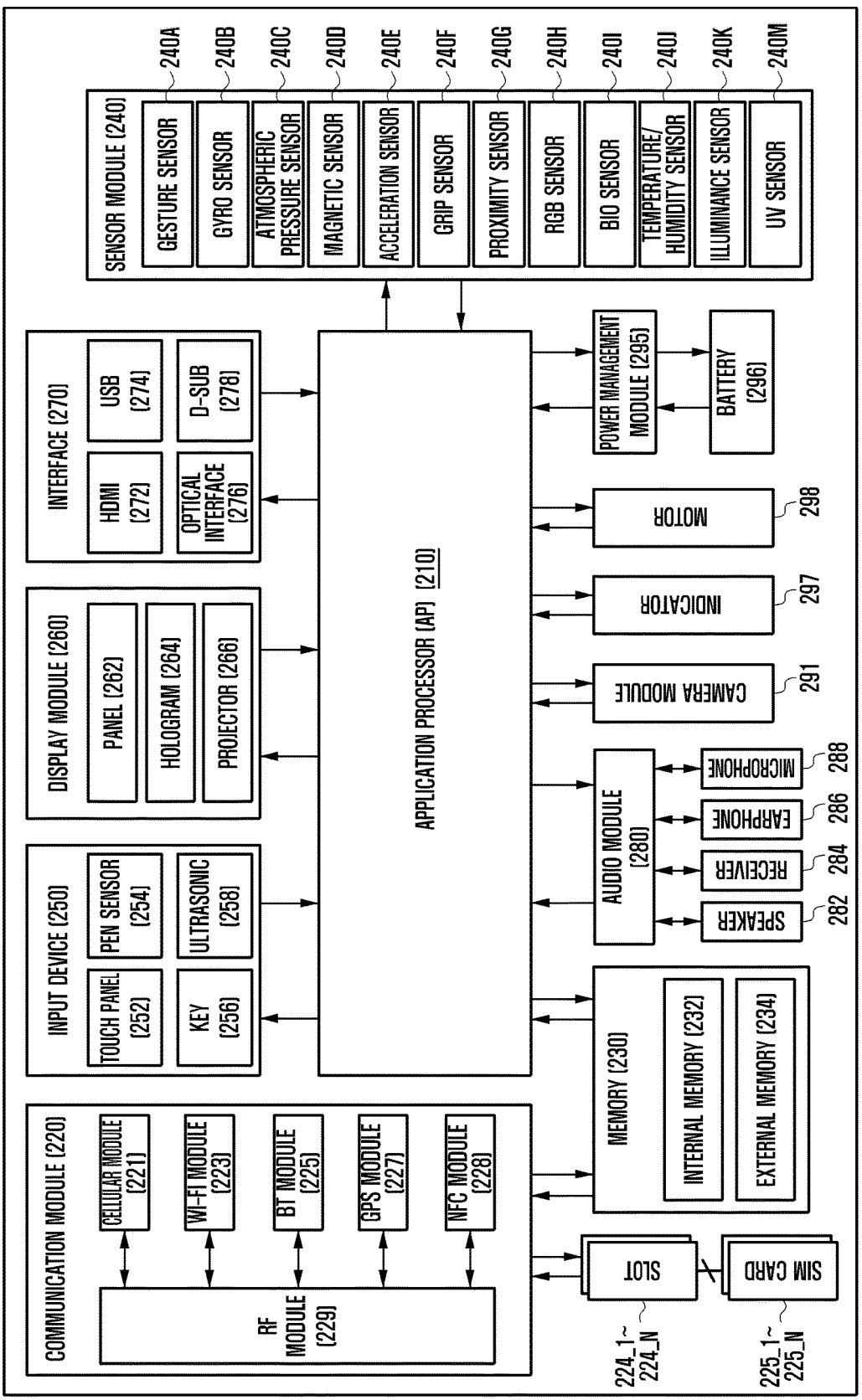
FIG. 2 is a block diagram of a configuration of an electronic device according to an embodiment of the present invention.

FIG. 2 is a block diagram illustrating a configuration of an electronic device 201 in accordance with an embodiment of the present invention. The electronic device 201 forms, for example, the whole or part of the electronic device 101 shown in FIG. 1. Referring to FIG. 2, the electronic device 201 includes at least one application processor (AP) 210, a communication module 220, a subscriber identification module (SIM) card 225_1~225_N, a memory 230, a sensor module 240, an input unit 250, a display 260, an interface 270, an audio module 280, a camera module 291, a power management module 295, a battery 296, an indicator 297, and a motor 298.

The AP 210 drives an operating system or applications, controls a plurality of hardware or software components connected thereto, and also performs processing and operations for various data including multimedia data. The AP 210 may, for example, be formed of system-on-chip (SoC). According to an embodiment of the present invention, the AP 210 may further include a graphic processing unit (GPU).

The communication module 220 (e.g., the communication interface 160 of FIG. 1) performs a data communication with any other electronic device (e.g., the electronic device 104 or the server 106 of FIG. 1) connected to the electronic device 200 (e.g., the electronic device 101 of FIG. 1) through the network. According to an embodiment of the present invention, the communication module 220 may include therein a cellular module 221, a WiFi module 223, a BT module 225, a GPS module 227, an NFC module 228, and a Radio Frequency (RF) module 229.

The cellular module 221 offers a voice call, a video call, a message service, an internet service, or the like through a communication network (e.g., LTE, LTE-A, CDMA, WCDMA, UMTS, WiBro, or GSM, etc.). Additionally, the cellular module 221 performs identification and authentication of the electronic device in the communication network, using the SIM card 224. According to an embodiment of the present invention, the cellular module 221 performs at least part of functions the AP 210 can provide. For example, the cellular module 221 may perform at least part of a multimedia control function.

According to an embodiment of the present invention, the cellular module 221 may include a communication processor (CP). Additionally, the cellular module 221 may be formed of SoC, for example. Although some elements such as the cellular module 221 (e.g., the CP), the memory 230, or the power management module 295 are shown as separate elements being different from the AP 210 in FIG. 2, the AP 210 may be formed to have at least part (e.g., the cellular module 221) of the above elements in an embodiment of the present invention.

According to an embodiment of the present invention, the AP 210 or the cellular module 221 (e.g., the CP) loads commands or data, received from a nonvolatile memory connected thereto or from at least one of the other elements, into a volatile memory to process them. Additionally, the AP 210 or the cellular module 221 stores data, received from or created at one or more of the other elements, in the nonvolatile memory.

Each of the WiFi module 223, the BT module 225, the GPS module 227 and the NFC module 228 may include a processor for processing data transmitted or received therethrough. Although FIG. 2 shows the cellular module 221, the WiFi module 223, the BT module 225, the GPS module 227 and the NFC module 228 as different blocks, at least part of them may be contained in a single Integrated Circuit (IC) chip or a single IC package in an embodiment of the present invention. For example, at least part (e.g., the CP corresponding to the cellular module 221 and a WiFi processor corresponding to the WiFi module 223) of respective processors corresponding to the cellular module 221, the WiFi module 223, the BT module 225, the GPS module 227 and the NFC module 228 may be formed as a single SoC.

The RF module 229 transmits and receives data, e.g., RF signals or any other electric signals. Although not shown, the RF module 229 may include a transceiver, a Power Amp Module (PAM), a frequency filter, a Low Noise Amplifier (LNA), or the like. Also, the RF module 229 may include any component, e.g., a wire or a conductor, for transmission of electromagnetic waves in a free air space. Although FIG. 2 shows that the cellular module 221, the WiFi module 223, the BT module 225, the GPS module 227 and the NFC module 228 share the RF module 229, at least one of them may perform transmission and reception of RF signals through a separate RF module in an embodiment of the present invention.

The SIM card 225_1 to 225_N may be a specific card formed of SIM and may be inserted into a slot 224_1 to 224_N formed at a certain place of the electronic device. The SIM card 225_1 to 225_N may contain therein an Integrated Circuit Card IDentifier (ICCID) or an International Mobile Subscriber Identity (IMSI).

The memory 230 (e.g., the memory 130 of FIG. 1) may include an internal memory 232 and an external memory 234. The internal memory 232 may include, for example, at least one of a volatile memory (e.g., Dynamic Random Access Memory (RAM) (DRAM), Static RAM (SRAM), Synchronous DRAM (SDRAM), etc.) or a nonvolatile memory (e.g., OTPROM (One Time Programmable Read Only Memory (ROM) (OTPROM), Programmable ROM (PROM), Erasable and Programmable ROM (EPROM), Electrically Erasable and Programmable ROM (EEPROM), mask ROM, flash ROM, NAND flash memory, NOR flash memory, etc.).

According to an embodiment of the present invention, the internal memory 232 may have the form of a Solid State Drive (SSD). The external memory 234 may include a flash drive, for example, Compact Flash (CF), Secure Digital (SD), Micro Secure Digital (Micro-SD), Mini Secure Digital (Mini-SD), eXtreme Digital (xD), memory stick, or the like. The external memory 234 may be functionally connected to the electronic device 200 through various interfaces. According to an embodiment of the present invention, the electronic device 200 may further include a storage device or medium such as a hard drive.

The sensor module 240 measures a physical quantity or senses an operating status of the electronic device 200, and then converts measured or sensed information into electric signals. The sensor module 240 may include, for example, at least one of a gesture sensor 240A, a gyro sensor 240B, an atmospheric sensor 240C, a magnetic sensor 240D, an acceleration sensor 240E, a grip sensor 240F, a proximity sensor 240G, a color sensor 240H (e.g., Red, Green, Blue (RGB) sensor), a biometric sensor 240I, a temperature-humidity sensor 240J, an illumination sensor 240K, and an ultraviolet (UV) sensor 240M. Alternatively, the sensor module 240 may include, e.g., an E-nose sensor, an electromyography (EMG) sensor, an electroencephalogram (EEG) sensor, an electrocardiogram (ECG) sensor, an infrared (IR) sensor, an iris scan sensor, or a finger scan sensor. Also, the sensor module 240 may include a control circuit for controlling one or more sensors equipped therein.

The input unit 250 may include a touch panel 252, a digital pen sensor 254, a key 256, or an ultrasonic input unit 258. The touch panel 252 recognizes a touch input in a manner of a capacitive type, a resistive type, an infrared type, or an ultrasonic type. Also, the touch panel 252 may further include a control circuit. In case of a capacitive type, a physical contact or proximity may be recognized. The touch panel 252 may further include a tactile layer. In this case, the touch panel 252 may offer a tactile feedback to a user.

The digital pen sensor 254 may be formed in the same or similar manner as receiving a touch input or by using a separate recognition sheet. The key 256 may include, for example, a physical button, an optical key, or a keypad. The ultrasonic input unit 258 is a specific device capable of identifying data by sensing sound waves with a microphone 288 in the electronic device 200 through an input tool that generates ultrasonic signals, thus allowing wireless recognition. According to an embodiment of the present invention, the electronic device 200 may receive a user input from any external device (e.g., a computer or a server) connected thereto through the communication module 220.

The display 260 (e.g., the display 150) may include a panel 262, a hologram 264, or a projector 266. The panel 262 may be, for example, Liquid Crystal Display (LCD), Active Matrix Organic Light Emitting Diode (AM-OLED), or the like. The panel 262 may have a flexible, transparent or wearable form. The panel 262 may be formed of a single module with the touch panel 252. The hologram 264 shows a stereoscopic image in the air using interference of light. The projector 266 projects an image onto a screen, which may be located at the inside or outside of the electronic device 200. According to an embodiment of the present invention, the display 260 may further include a control circuit for controlling the panel 262, the hologram 264, and the projector 266.

The interface 270 may include, for example, a High-Definition Multimedia Interface (HDMI) 272, a Universal Serial Bus (USB) 274, an optical interface 276, or a D-subminiature (D-sub) 278. The interface 270 may be contained, for example, in the communication interface 160 shown in FIG. 1. Alternatively, the interface 270 may include, for example, a Mobile High-definition Link (MHL) interface, a Secure Digital (SD) card/Multi-Media Card (MMC) interface, or an Infrared Data Association (IrDA) interface.

The audio module 280 performs a conversion between sounds and electric signals. At least part of the audio module 280 may be contained, for example, in the input/output interface 140 shown in FIG. 1. The audio module 280 processes sound information inputted or outputted through a speaker 282, a receiver 284, an earphone 286, or a microphone 288.

The camera module 291 is a device capable of obtaining still images and moving images. According to an embodiment of the present invention, the camera module 291 may include at least one image sensor (e.g., a front sensor or a rear sensor), a lens, an Image Signal Processor (ISP), or a flash (e.g., Light-Emitting Diode (LED) or xenon lamp).

The power management module 295 manages electric power of the electronic device 200. Although not shown, the power management module 295 may include, for example, a Power Management Integrated Circuit (PMIC), a charger IC, or a battery or fuel gauge.

The PMIC may be formed, for example, of an IC chip or SoC. Charging may be performed in a wired or wireless manner. The charger IC charges a battery 296 and prevents overvoltage or overcurrent from a charger. According to an embodiment of the present invention, the charger IC may have a charger IC used for at least one of wired and wireless charging types. A wireless charging type may include, for example, a magnetic resonance type, a magnetic induction type, or an electromagnetic type. Any additional circuit for a wireless charging may be further used such as a coil loop, a resonance circuit, or a rectifier.

The battery gauge measures the residual amount of the battery 296 and a voltage, current or temperature in a charging process. The battery 296 stores or creates electric power therein and supplies electric power to the electronic device 200. The battery 296 may be, for example, a rechargeable battery or a solar battery.

The indicator 297 shows thereon a current status (e.g., a booting status, a message status, or a recharging status) of the electronic device 200 or of its part (e.g., the AP 210). The motor 298 converts an electric signal into a mechanical vibration. Although not shown, the electronic device 200 may include a specific processor (e.g., GPU) for supporting a mobile TV. This processor may process media data that comply with standards of Digital Multimedia Broadcasting (DMB), Digital Video Broadcasting (DVB), or media flow.

Each of the above-discussed elements of the electronic device disclosed herein may be formed of one or more components, and its name may be varied according to the type of the electronic device. The electronic device disclosed herein may be formed of at least one of the above-discussed elements without some elements or with additional other elements. Some of the elements may be integrated into a single entity that still performs the same functions as those of such elements before integrated.

The term "module" used in this invention may refer to a certain unit that includes one of hardware, software, firmware, or any combination thereof. The module may be interchangeably used with unit, logic, logical block, component, or circuit. The module may be the minimum unit, or part thereof, which performs one or more particular functions. The module may be formed mechanically or electronically. For example, the module disclosed herein may include at least one of Application-Specific Integrated Circuit (ASIC) chip, Field-Programmable Gate Arrays (FPGAs), and programmable-logic device, which have been known or are to be developed.

Figure 3:
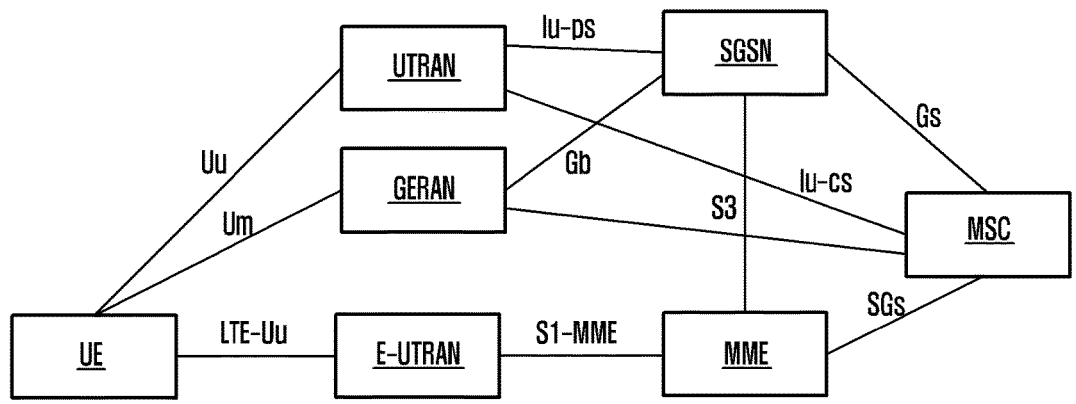
FIG. 3 illustrates basic network architecture for a CSFB operation in relation to an electronic device and method of providing call services according to an embodiment of the present invention.

FIG. 3 illustrates basic network architecture for a CSFB operation in relation to an electronic device 200 and a method of providing call services for the same according to an embodiment of the present invention.

In the method of providing call services, the electronic device 200 may be transferred from a Long Term Evolution (LTE) network to a Global System for Mobile communications (GSM)/Wideband Code Division Multiple Access (WCDMA) network through Circuit Switched Fallback (CSFB).

In FIG. 3, each block represents a network entity, and each line represents an interface between network entities. Communication interfaces indicated by lines are interfaces defined in public standards and a detailed description thereof is omitted. Referring to FIG. 3, the LTE network and the WCDMA network may be interconnected through the SGs interface between the Mobility Management Entity (MME) and the Mobile Switching Center (MSC) and the S3 interface between the MME and the Serving GPRS Support Node (SGSN). The LTE network supports packet based services and does not support circuit switched (CS) services. When a call request for a CS service is received by the MSC, the MSC has to send a paging message to a corresponding terminal through a cell at which the terminal is located. When the terminal is located at a cell of the LTE network, the MSC delivers a paging message to the LTE network through the MME. To this end, the electronic device 200 (here, the electronic device 200 is used as user equipment (UE)) registers itself in advance at the MSC through the MME to indicate that the electronic device 200 is attached to the LTE network. When the UE receives the paging message through the LTE network, the network (base station) sends a command to move to a 3G network to the UE. Upon receiving the command, the UE drops the LTE network connection, switches its radio to the WCDMA network, and sends a page response message to the MSC. Thereafter, the UE may provide a call service through the WCDMA network.

That is, the electronic device 200 (user equipment) according to an embodiment of the present invention may provide a service through the LTE network (evolved UTRAN (E-UTRAN)) or provide a service through a 2G network (GERAN) or a 3G network (UTRAN) on the basis of CSFB.

Figure 4:
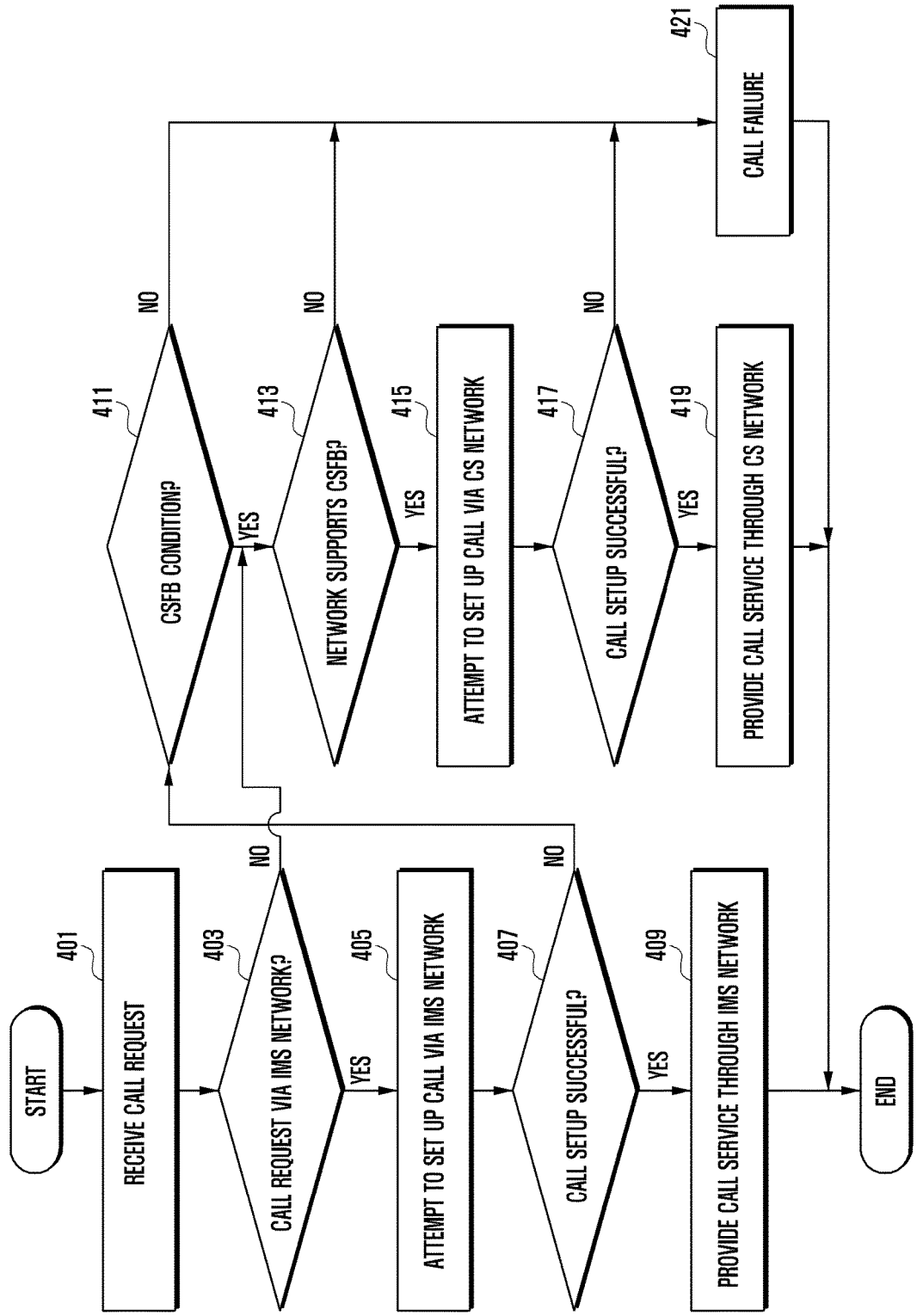
FIG. 4 is a flowchart of a method of providing call services for an electronic device according to an embodiment of the present invention.

FIG. 4 is a flowchart of the method of providing call services for an electronic device 200 according to an embodiment of the present invention.

At step 401, the electronic device 200 receives a call request from the user. Here, the call request may be a request for a voice call, a video call or a supplementary service. The call request may be a request for a VoLTE call. The call request may be initiated through the input unit of the electronic device 200.

At step 403, the electronic device 200 determines whether the call request is a request for a call via an Internet Protocol (IP) Multimedia System (IMS) network. The electronic device 200 may be attached not only to an LTE network but also to a 2G/3G network. That is, the electronic device 200 may be attached both to the IMS network and to the GSM EDGE Radio Access Network (GERAN)/UMTS Terrestrial Radio Access Network (UTRAN). Hence, the electronic device 200 determines whether the call request of the user is a request for a call via the LTE network (IMS network) at step 403 before making a call setup attempt. If the call request is a request for a call via an IMS network, the procedure proceeds to step 405. If the call request is not a request for a call via an IMS network, the procedure proceeds to step 413.

At step 405, the electronic device 200 makes an attempt to set up a call via the IMS network. The electronic device 200 may send an INVITE message to the IMS network at step 405.

At step 407, the electronic device 200 determines whether the attempt for a call setup via the IMS network is successful. The electronic device 200 may determine that the attempt for the call setup is unsuccessful when an error message (Error/Reject) is received from the IMS network or when no response is received from the IMS network for a given time or more due to a packet loss or the like. If it is determined that the attempt for the call setup via the IMS network is successful, the procedure proceeds to step 409. If it is determined that the attempt for the call setup via the IMS network is unsuccessful, the procedure proceeds to step 411.

At step 409, the electronic device 200 provides a call service through the IMS network. The electronic device 200 may provide a VoLTE service with higher sound quality and responsiveness in comparison to a voice service via a 3G (or 2G) network.

At step 411, the electronic device 200 determines whether a CSFB condition is satisfied. Specifically, the Session Initiation Protocol (SIP) error code contained in the error message received from the IMS network is related with "Internal Timeout", "Service Unavailable" or "Alternative Service", the electronic device 200 may determine that a CSFB condition is satisfied. Here, errors corresponding to a CSFB condition may include network errors (e.g. 606 "Not Acceptable", 503 "Service Unavailable", 480 "Temporarily Unavailable", 404 "Not Found", or 488 "Not Acceptable Here"), and may be set differently or changed according to service providers or regional characteristics. If it is determined that a CSFB condition is satisfied, the procedure proceeds to step 413. If it is determined that a CSFB condition is not satisfied, the procedure proceeds to step 421.

At step 413, the electronic device 200 determines whether the current network supports CSFB. When the electronic device 200 sends an attach request message to the Mobility Management Entity (MME) and receives a corresponding attach accept message from the MME, it may determine that the current network supports CSFB. For example, the electronic device 200 may send an Attach Request message with Combined Evolved Packet System (EPS)/IMSI Attach to the MME. That is, the electronic device 200 may send an Attach Request message targeted at the LTE network and the 3G network (or 2G network) to the MME. The MME performs SGs-Access Point (AP)-Location-Update along with the MSC and sends an Attach Accept message with Combined EPS/IMSI Attach. Hence, when an Attach Accept message with Combined EPS/IMSI Attach is received from the MME, the electronic device 200 may determine that the current network supports CSFB. If it is determined that the current network supports CSFB, the procedure proceeds to step 414. If it is determined that the current network does not support CSFB, the procedure proceeds to step 421.

In various embodiments of the present invention, step 411 (satisfaction of a CSFB condition) and step 413 (network support for CSFB) may be carried out in any order, or one thereof may be skipped. For example, in one embodiment of the method for providing call services, step 413 may be carried out first and then step 411 may be carried out. In another embodiment of the method for providing call services, step 413 may be carried out with step 411 skipped.

At step 415, the electronic device 200 performs the CSFB operation. Specifically, the electronic device 200 may send an Extended Service Request message to the MME. Upon receiving the Extended Service Request message, the MME may send a CSFB indication to the base station (eNodeB). Here, the CSFB indication sent by the MME may be a UE context modification request message. As a reply, the eNodeB may send a UE context modification accept message to the MME and notify the electronic device 200 of a CS network frequency for CSFB. Hence, the electronic device 200 may perform the CSFB to a CS network corresponding to the frequency notified by the eNodeB at step 415. That is, the electronic device 200 may drop the existing IMS (LTE) network connection and attach to a circuit-switched network (2G or 3G network). Here, the CS network may be the GERAN or the UTRAN. At step 415, the electronic device 200 makes an attempt to set up a call through the CS network.

At step 417, the electronic device 200 determines whether the attempt for the call setup is successful. If it is determined that the attempt for the call setup is successful, the procedure proceeds to step 419. If it is determined that the attempt for the call setup is unsuccessful, the procedure proceeds to step 421.

At step 419, the electronic device 200 provides a call service to the user through the CS network.

At step 421, the electronic device 200 may notify the user of a call setup failure. For example, the electronic device 200 may display a call failure window on the display module or output sounds indicating a call setup failure through the audio module.

According to the method for providing call services in accordance with an embodiment of the present invention, in the course of handling a user request for a packet-based voice service via an IMS network (e.g. VoLTE service), when a call setup via the IMS network fails, the electronic device 200 may automatically perform a CSFB operation and provide a voice service through a 3G (or 2G) network, achieving stable delivery of a call service.

Figure 5:
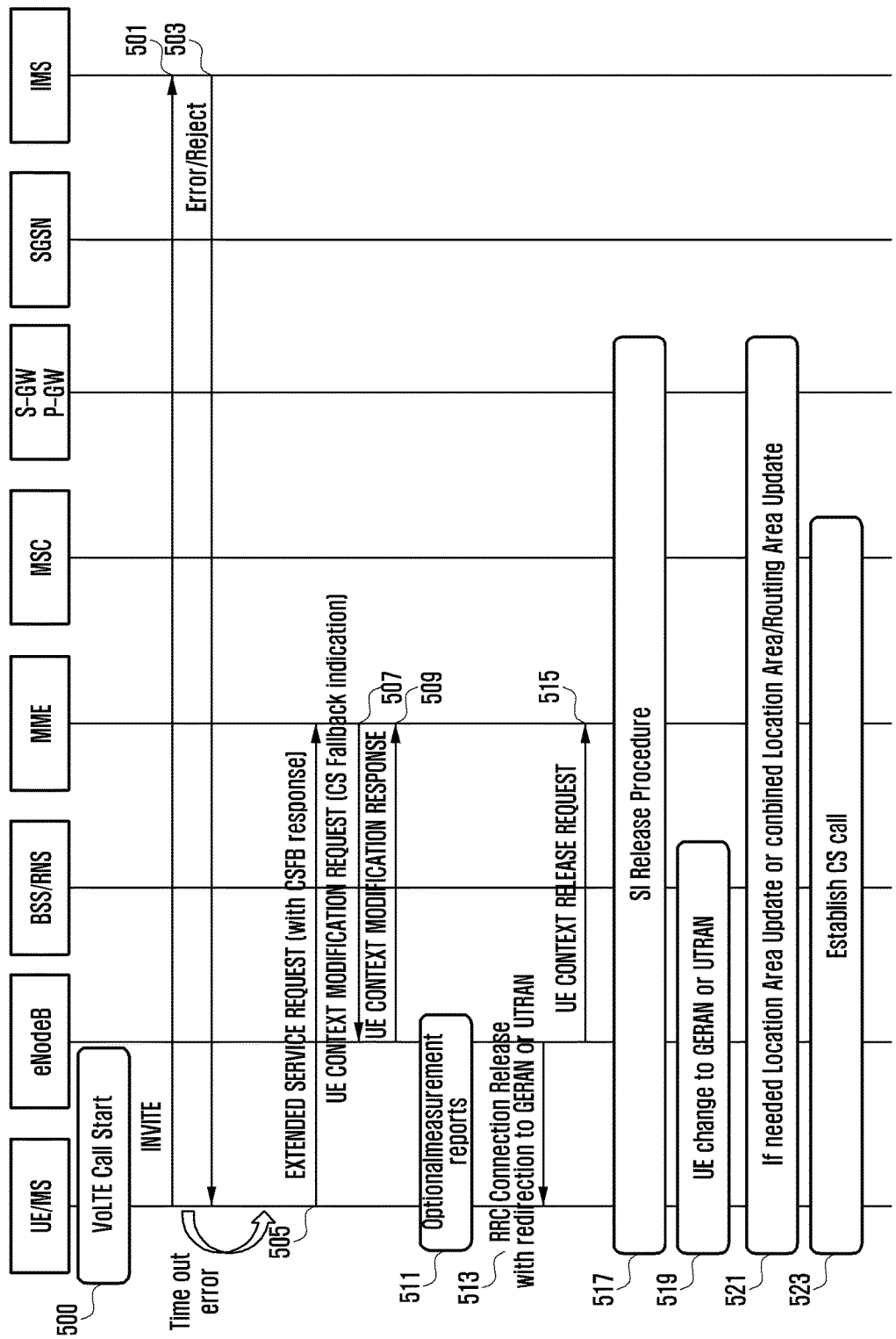
FIG. 5 is a sequence diagram illustrating a method of providing call services for an electronic device according to an embodiment of the present invention.

FIG. 5 is a sequence diagram illustrating the method of providing call services for the electronic device 200 according to an embodiment of the present invention. In the following description of FIG. 5, the electronic device 200 is used as user equipment (UE).

At step 500, the UE receives a voice call request from the user. The voice call request may be a request for a VoLTE voice call via an LTE network. At step 501, upon receiving a call request, the UE sends an Invite message to the IMS network. At step 503, the UE receives a response message from the IMS network. Here, the UE determines that a call setup is unsuccessful when an error message (Error/Reject) is received from the IMS network or when no response is received from the IMS network for a given time or more. At step 503, the UE may further determine satisfaction of a CSFB condition and support of CSFB in a current network and may determine to conduct a CSFB operation. In this case, the method for providing call services described in connection with FIG. 4 may be carried out.

At step 505, the UE sends an Extended Service Request to the MME. At step 507, as a reply to the Extended Service Request, the MME sends a CSFB indication to the eNodeB. Here, the CSFB indication may be sent as part of a UE context modification request. At step 509, as a reply, the eNodeB sends a UE context modification response to the MME. At step 511, the UE and the eNodeB perform a procedure for optional measurement reports. That is, the UE and the eNodeB may exchange additional information for the CSFB operation at step 511. At step 513, the UE receives an indication for releasing the LTE network connection and redirecting to a 2G/3G network from the eNodeB. Here, the UE may receive a Radio Resource Control (RRC) Connection Release message with a redirection to the GERAN or UTRAN from the eNodeB. At step 515, the eNodeB sends a UE Context Release Request to the MME. At step 517, the UE performs the System Information (SI) Release procedure to drop signaling connections with the current network. At step 519, the UE completes the CSFB to the GERAN or UTRAN (2G/3G network). The UE may attach to the 2G/3G network via a base station (Base Station System (BSS)/Radio Network System (RNS)). At step 521, the UE may perform a Location Area Update or combined Location Area/Routing Area Update. At step 523, the UE provides a call service via the MSC of the network after performing the CSFB (GERAN or UTRAN). Here, the call service may be a CS call service.

Figure 6:
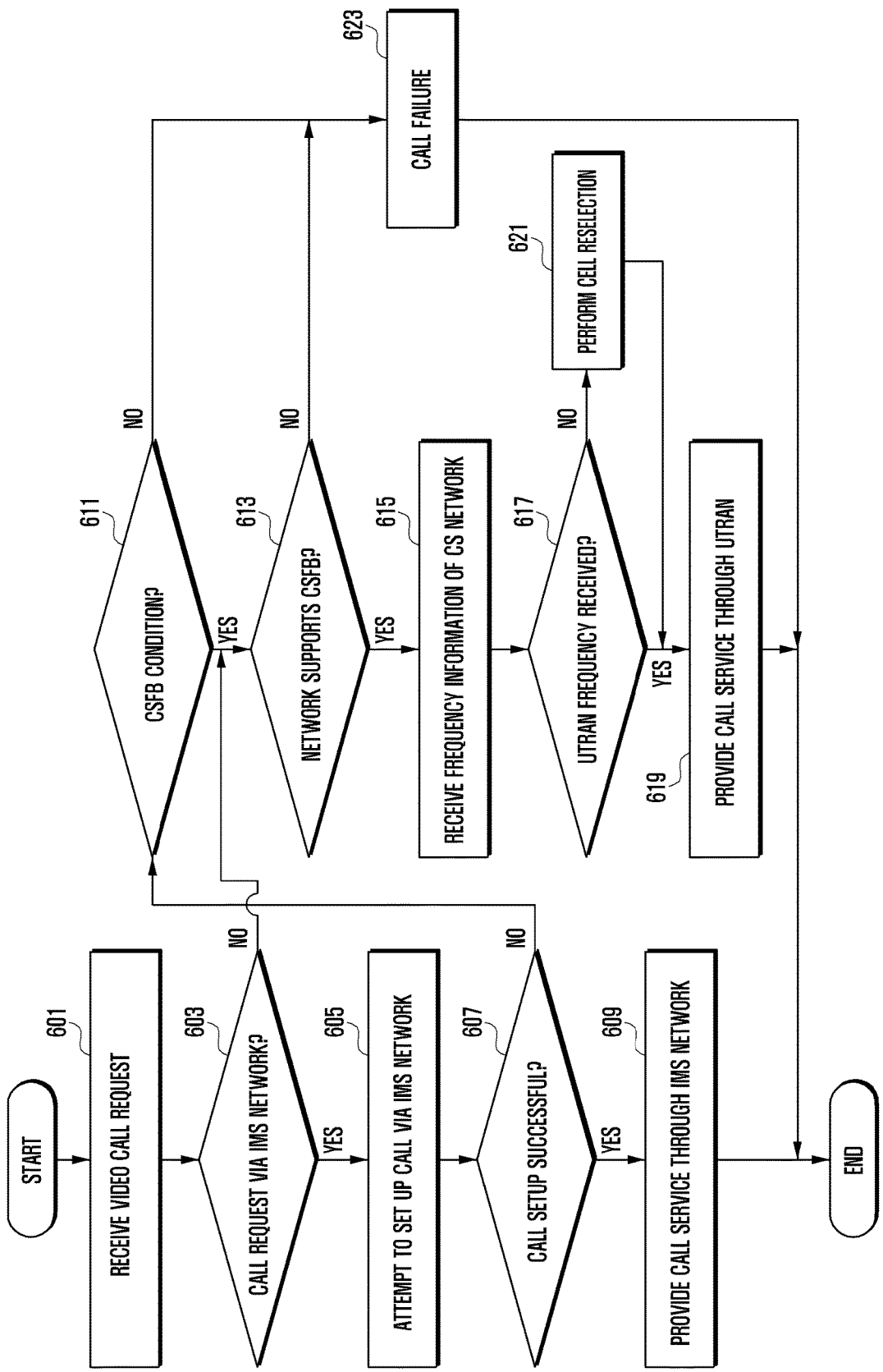
FIG. 6 is a flowchart of a method of providing call services for an electronic device according to another embodiment of the present invention.

FIG. 6 is a flowchart of a method of providing call services for the electronic device 200 according to another embodiment of the present invention. In FIG. 6, it is assumed that a call request of the user is a request for a video call. A detailed description of steps similar to those of FIG. 4 may be omitted.

At step 601, the electronic device 200 receives a video call request from the user. Here, the video call request may be a request for a VoLTE video call via an IMS (LTE) network.

At step 603, the electronic device 200 determines whether the video call request is a request for a video call via an IMS network. If it is determined that the video call request is a request for a video call via an IMS network, the procedure proceeds to step 605. If it is determined that the video call request is not a request for a video call via an IMS network, the procedure proceeds to step 613.

At step 605, the electronic device 200 makes an attempt to set up a call via the IMS network. Here, the electronic device 200 may send an INVITE message to the IMS network.

At step 607, the electronic device 200 determines whether the attempt for the call setup via the IMS network is successful. The electronic device 200 may determine that call setup is unsuccessful when an error message (Error/Reject) is received from the IMS network or when no response is received from the IMS network for a given time or more. If it is determined that the attempt for the call setup via the IMS network is successful, the procedure proceeds to step 609. If it is determined that the attempt for the call setup via the IMS network is unsuccessful, the procedure proceeds to step 611.

At step 609, the electronic device 200 provides a video call service to the user through the IMS network. Here, the electronic device 200 may provide the user with a VoLTE video call service through the IMS network.

At step 611, upon a failure of the attempt for the call setup via the IMS network, the electronic device 200 determines whether a CSFB condition is satisfied. Specifically, the SIP error code contained in the error message received from the IMS network is related with "Internal Timeout", "Service Unavailable" or "Alternative Service", the electronic device 200 may determine that a CSFB condition is satisfied. If it is determined that a CSFB condition is satisfied, the procedure proceeds to step 613. If it is determined that a CSFB condition is not satisfied, the procedure proceeds to step 623 at which the electronic device 200 fails in the call setup.

At step 613, the electronic device 200 determines whether the current network supports CSFB. When the electronic device 200 sends an attach request message to the MME and receives a corresponding attach accept message from the MME, it may determine that the current network supports CSFB. If it is determined that the current network supports CSFB, the procedure proceeds to step 615. If it is determined that the current network does not support CSFB, the procedure proceeds to step 623.

At step 615, the electronic device 200 receives a CS network frequency for CSFB from the eNodeB. Here, the eNodeB may send frequency information of 2G or 3G networks (GERAN or UTRAN) without consideration of the type of the user call request. Hence, the electronic device 200 may receive GERAN or UTRAN frequency information from the eNodeB.

At step 617, the electronic device 200 determines whether the received frequency information indicates a UTRAN frequency. A video call service cannot be delivered through a 2G network (GERAN) supporting only CS services. Hence, in the event that the user call request is a request for a video call, when a 2G network (GERAN) frequency is received from the eNodeB, it is necessary for the electronic device 200 to perform a cell reselection to a 3G network. As such, if it is determined that the frequency information received from the eNodeB indicates a UTRAN frequency, the procedure proceeds to step 619. If it is determined that the received frequency information indicates a GERAN frequency, the procedure proceeds to step 621 at which the electronic device 200 performs a cell reselection to a 3G network.

At step 619, the electronic device 200 provides a video call service to the user through the UTRAN. According to the method for providing call services in accordance with an embodiment of the present invention, in the course of handling a user request for a VoLTE service such as a VoLTE video call, when a network error occurs in the LTE network, the electronic device 200 may provide a video call service through a 3G network in an automatic way without causing user inconvenience due to a call failure.

At step 621, the electronic device 200 performs a cell reselection. When the cell information received from the current network indicates a GERAN (2G) cell, the electronic device 200 may perform a cell reselection to a UTRAN (3G) cell. Specifically, the electronic device 200 may receive system information broadcast by the base station and perform a blind cell reselection on the basis of the system information. Here, the system information may be System Information Block 6 (SIB 6) carrying UTRAN neighbor cell information. The electronic device 200 may change the serving cell to a UTRAN cell through a cell reselection based on neighbor cell information. Hence, if the received frequency information indicates a GERAN (2G) frequency, the electronic device 200 may perform a cell reselection to a UTRAN (3G) cell. Thereafter, at step 619, the electronic device 200 provides a video call service to the user through the UTRAN.

Accordingly, according to the method for providing call services in accordance with an embodiment of the present invention, when the video call setup via the IMS network fails, the electronic device 200 may perform a cell reselection to a 3G network without unnecessary CSFB to a 2G network and provide a stable video call service through the 3G network.

Figure 7:
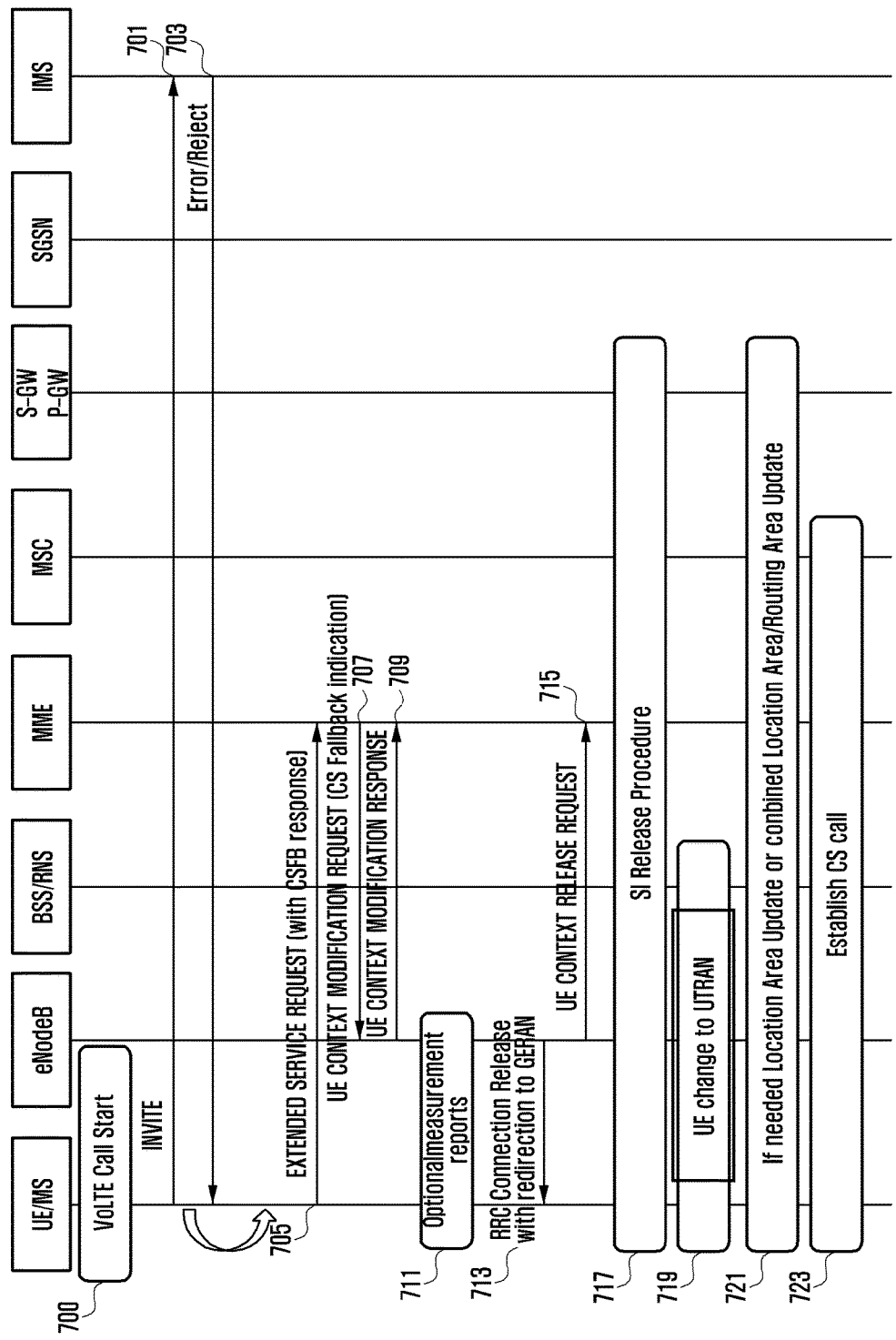
FIG. 7 is a sequence diagram illustrating a method of providing call services for an electronic device according to another embodiment of the present invention.

FIG. 7 is a sequence diagram illustrating the method of providing call services for the electronic device 200 according to another embodiment of the present invention. A detailed description of steps similar to those of FIG. 5 may be omitted. In the following description of FIG. 7, the electronic device 200 is used as user equipment (UE).

Referring to FIG. 7, at step 700, the UE receives a video call request from the user. The video call request may be a request for a VoLTE video call. At step 701, the UE determines that the video call request from the user is a request for a video call via an IMS network and sends an Invite message to the IMS network. At step 703, when an error message (error/reject) is received from the IMS network, the UE determines to perform the CSFB as described in FIG. 6. At steps 705 to 711, operations similar to those at steps 505 to 511 of FIG. 5 are carried out.

At step 713, the UE receives an indication for releasing the LTE network connection and falling back to a 2G network from the eNodeB. At step 713, the eNodeB sends a 2G network (GERAN) frequency to the UE according to UE location (cell) information and neighboring base stations (BSS/RNS) without consideration of the type of the user call request. That is, the UE may receive GERAN frequency information from the eNodeB and perform the CSFB from the LTE network to the 2G network (GERAN). However, as a video call needs packet switching, a 2G network supporting only circuit switching is unable to provide a video call service. In other words, if the UE performs the CSFB to a 2G network, it cannot provide a video call service to the user. In this case, the UE may perform a blind cell reselection by use of neighbor cell information received from the eNodeB. That is, in spite of the 2G network (GERAN) frequency information received from the eNodeB, the UE may select a cell managed by a base station of a 3G network on the basis of the neighbor cell information. Here, the neighbor cell information may be UTRAN neighbor cell information carried by System Information Block 6 (SIB 6). The UE may register itself at a cell of a 3G network supporting a video call service through a cell reselection without conforming to the direction of the eNodeB. Hence, at step 719, the UE performs a cell reselection to the UTRAN. Thereafter, at step 723, the UE delivers a video call service through the UTRAN. Here, operations in steps 715, 717 and 721 are similar to those of steps 515, 517 and 521, and thus the detailed description for these steps is omitted.

Figure 8:
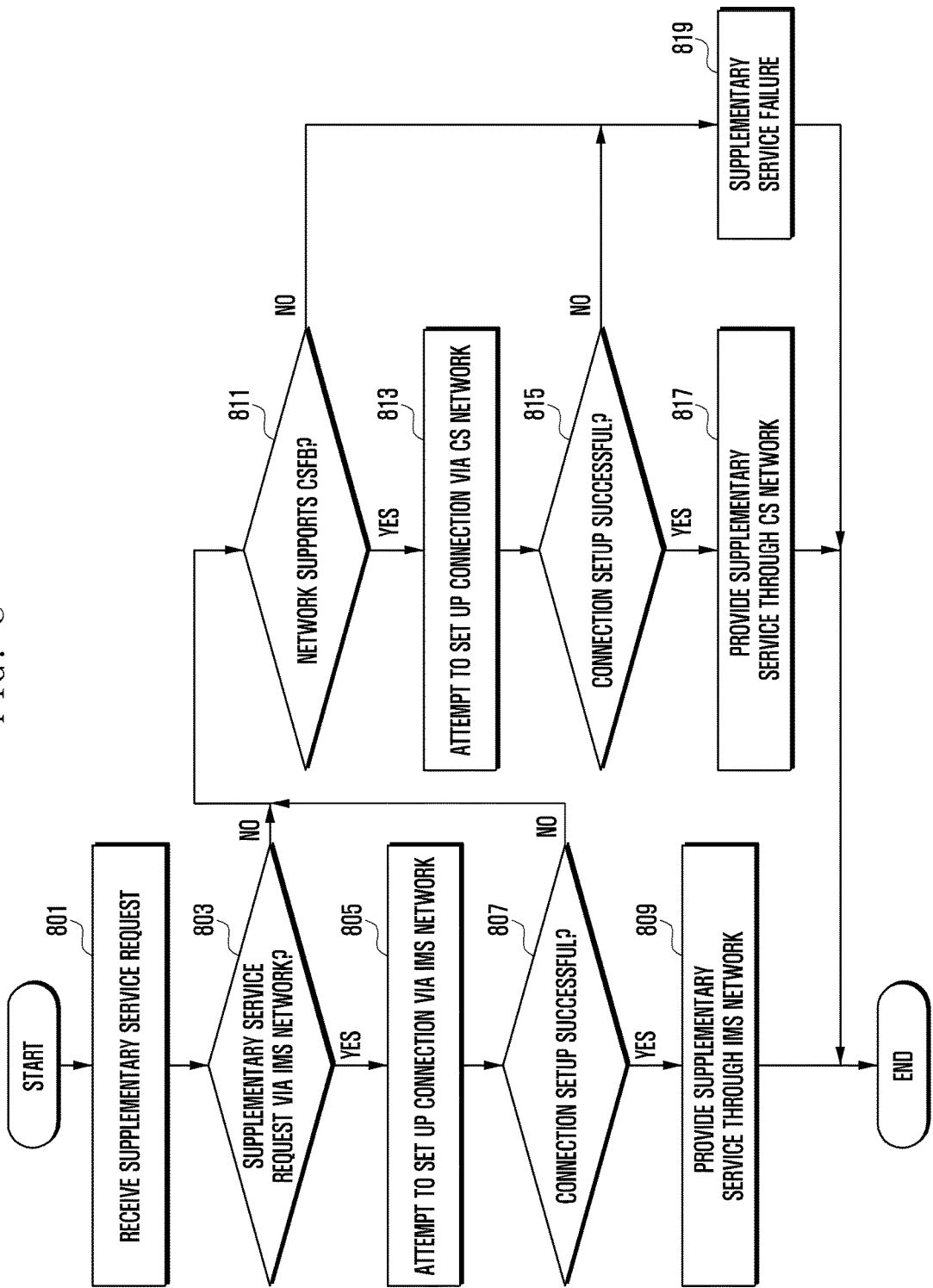
FIG. 8 is a flowchart of a method of providing call services for an electronic device according to another embodiment of the present invention.

FIG. 8 is a flowchart of a method of providing call services for the electronic device 200 according to yet another embodiment of the present invention. In FIG. 8, it is assumed that a call request of the user is a request for a supplementary service. A detailed description of steps similar to those of FIG. 4 may be omitted.

At step 801, the electronic device 200 receives a request for a supplementary service from the user. Here, the supplementary service may be a call barring service that restricts certain types of outgoing calls or incoming calls, a call forwarding service that redirects an incoming call to another internal number, or the like.

At step 803, the electronic device 200 determines whether the supplementary service request is a request for a supplementary service via an IMS network. That is, the electronic device 200 determines whether the user request is a request for a supplementary service via an IMS network. If it is determined that the user request is a request for a supplementary service via an IMS network, the procedure proceeds to step 805; and if it is determined that the user request is not a request for a supplementary service via an IMS network, the procedure proceeds to step 811.

At step 805, the electronic device 200 makes an attempt to set up a connection via the IMS network. That is, the electronic device 200 may send a supplementary service request message to the IMS network.

At step 807, the electronic device 200 determines whether the attempt for a connection setup to the IMS network is successful. The electronic device 200 may determine that the connection setup to the IMS network is unsuccessful when an error message (Error/Reject) is received from the IMS network or when no response is received from the IMS network for a given time or more owing to packet loss or the like. If it is determined that the attempt for the connection setup to the IMS network is successful, the procedure proceeds to step 809; and if it is determined that the attempt for the connection setup to the IMS network is unsuccessful, the procedure proceeds to step 811. In an embodiment described in FIG. 8, if it is determined that the attempt for the connection setup to the IMS network for a supplementary service request is unsuccessful, the CSFB is performed regardless of error types. However, it is possible to perform the CSFB conditionally based on certain Access Point Name (APN) types or error types of error messages (e.g. SIP error codes) from the IMS network according to needs of the service provider.

At step 811, the electronic device 200 determines whether the current network supports CSFB. Specifically, when the electronic device 200 sends an attach request message with Combined EPS/IMSI Attach to the MME and receives a corresponding attach accept message from the MME, it may determine that the current network supports CSFB. If it is determined that the current network supports CSFB, the procedure proceeds to step 813; and if it is determined that the current network does not support CSFB, the procedure proceeds to step 819.

At step 813, the electronic device 200 performs the CSFB to a CS network. Here, the CS network may be one of the GERAN and the UTRAN. Specifically, the electronic device 200 may send an Extended Service Request message to the MME, receive information (e.g. CS network information for the CSFB) from the eNodeB, and perform the CSFB to a CS network indicated by the information received from the eNodeB. The electronic device 200 makes an attempt to set up a connection to the CS network after performing the CSFB at step 813.

At step 815, the electronic device 200 determines whether the attempt for the connection setup to the CS network is successful. If it is determined that the attempt for the connection setup to the CS network is successful, the procedure proceeds to step 817 at which the electronic device 200 provides the requested supplementary service through the CS network. If it is determined that the attempt for the connection setup to the CS network is unsuccessful, the procedure proceeds to step 819 at which the electronic device 200 may notify the user of a failure in the delivery of the requested supplementary service.

Figure 9:
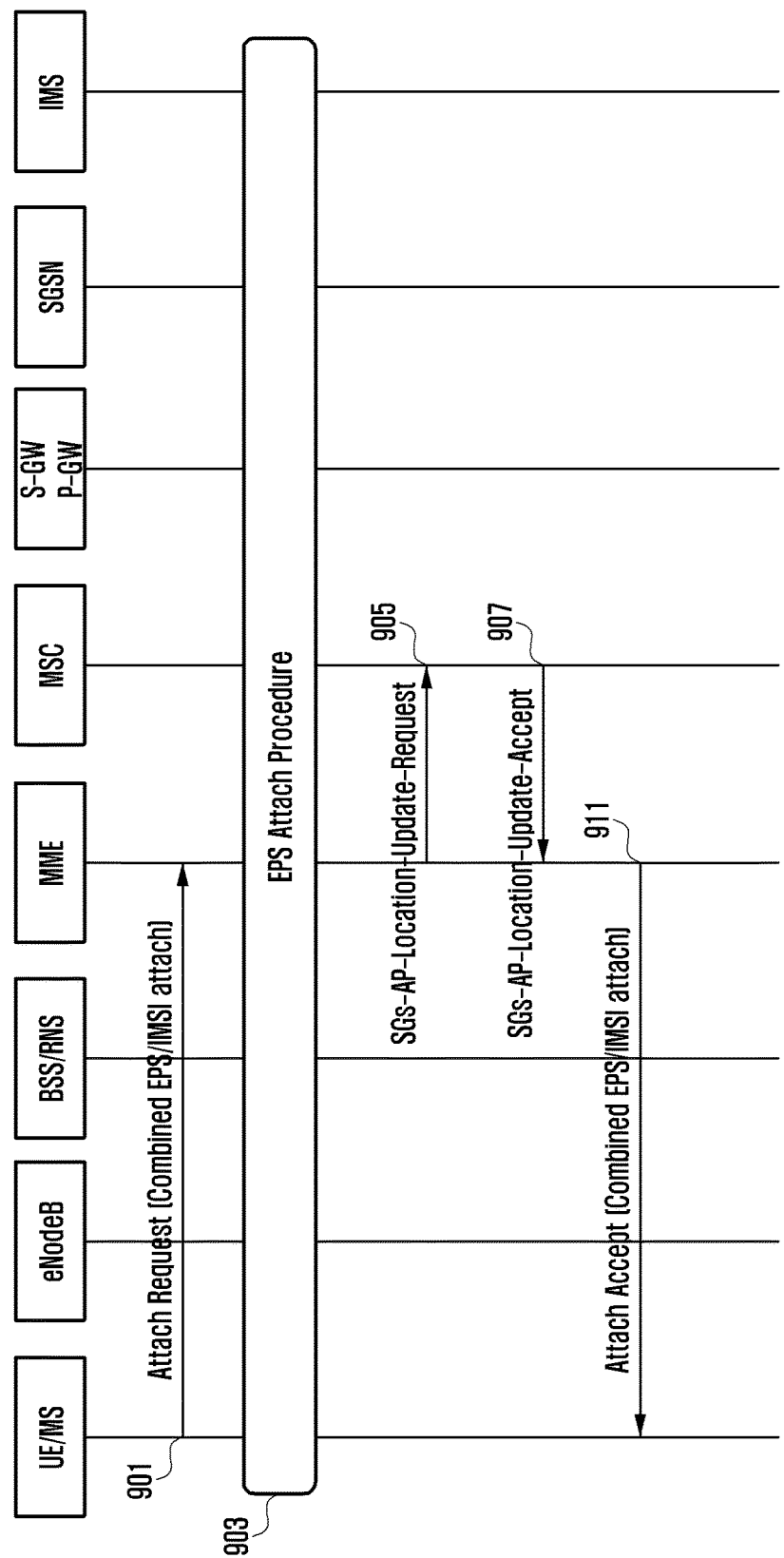
FIG. 9 is a sequence diagram illustrating an attach request procedure for determining CSFB supportability of a network in the method of providing call services for an electronic device according to an embodiment of the present invention.

FIG. 9 is a sequence diagram illustrating an attach request procedure for determining CSFB supportability of a network in the method of providing call services for the electronic device 200 according to an embodiment of the present invention. In the following description of FIG. 9, the electronic device 200 is used as user equipment (UE).

Referring to FIG. 9, at step 901, the UE sends an Attach Request message with Combined EPS/IMSI Attach to the MME. The UE may be capable of attaching to both an LTE network and a 2G/3G network. That is, the Attach Request message with Combined EPS/IMSI Attach may be an Attach Request message targeted at the LTE network and the 2G/3G network. At step 903, the UE attaches to the IMS network (or LTE network). When the UE attaches to (registers at) the LTE network, a SGs context may be configured between the MME and the MSC. That is, the current network may check CSFB supportability between the MME and the MSC. At step 905, the MME sends SGs-AP-Location-Update-Request to the MSC. At step 907, as a reply to the request, the MSC sends SGs-AP-Location-Update-Accept to the MME. At steps 905 and 907, if the current network supports CSFB, SGs-AP Location Update may be carried out between the MME and the MSC; and if the current network does not support CSFB, SGs-AP Location Update may be not carried out between the MME and the MSC.

At step 911, the MME sends an Attach Accept message with Combined EPS/EMSI attach to the UE. Hence, the UE may determine that the current network supports CSFB when an Attach Accept message with Combined EPS/EMSI attach is received, and may determine that the current network does not support CSFB when an Attach Accept message with Combined EPS/EMSI attach is not received.

The method of providing call services for an electronic device 200 according to an embodiment of the present invention may include receiving a call request from the user; determining whether the call request is a request for a call via an IP Multimedia System (IMS) network; making, when it is determined that the call request is a request for a call via an IMS network, an attempt to set up a call via the IMS network; determining whether the attempt for the call setup via the IMS network is successful; and performing CSFB when it is determined that the attempt for the call setup via the IMS network is unsuccessful.

Here, the call request may be one of a request for a voice call, a request for a video call, and a request for a supplementary service.

Determining whether the attempt for the call setup via the IMS network is successful may include determining that the attempt for the call setup is unsuccessful when an error message is received from the IMS network or when no response is received from the IMS network for a given time or more.

Performing the CSFB may include determining whether a CSFB condition is satisfied; determining, when it is determined that the CSFB condition is satisfied, whether the current network supports the CSFB; and conducting the CSFB when it is determined that the current network supports the CSFB.

Determining whether the CSFB condition is satisfied may include determining that a CSFB condition is satisfied when the SIP error code in the error message received from the IMS network is related with "Internal Timeout", "Service Unavailable", or "Alternative Service".

Determining whether the current network supports the CSFB may include determining that the current network supports CSFB when an attach request message is sent to the MME and a corresponding attach accept message is received from the MME.

Performing the CSFB may include sending an Extended Service Request message to the MME; receiving CS network frequency information for CSFB from the eNodeB having received a CSFB indication from the MME; and conducting CSFB to a CS network corresponding to the frequency information.

Here, the CS network may be one of the GERAN and the UTRAN.

In the method of providing call services, in the event that the call request from the user is a request for a video call, when the frequency information received from the eNodeB indicates a GERAN frequency, the electronic device 200 may perform a blind cell reselection to a UTRAN cell on the basis of system information received from the eNodeB.

Here, the system information may be System Information Block 6 (SIB 6).

The method of providing call services may further include making, after performing the CSFB, an attempt to set up a call via the CS network.

Figure 10:
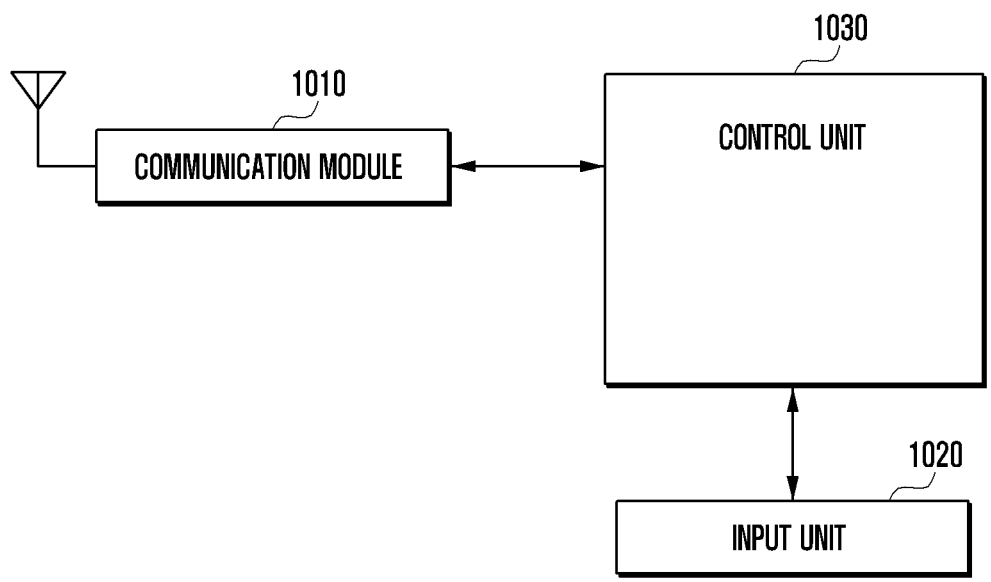
FIG. 10 is a block diagram of a configuration of an electronic device according to another embodiment of the present invention.

FIG. 10 is a block diagram of a configuration of the electronic device 200 according to another embodiment of the present invention.

Referring to FIG. 10, the electronic device 200 includes a communication module 1010, an input unit 1020, and a control unit 1030.

The communication module 1010 connects to a network through a base station. The communication module 1010 may correspond to the communication module 220 of FIG. 2. That is, the communication module 1010 may include a cellular module 221, Wi-Fi module 223, BT module 225, GPS module 227, NFC module 228, and RF module 229.

In particular, the cellular module 221 delivers a voice call service, a video call service, a text message service, and an Internet service through a communication network (e.g. LTE, LTE-A, CDMA, WCDMA, UMTS, WiBro, or GSM). The cellular module 221 identifies and authenticates the electronic device 200 in the communication network using, for example, a subscriber identification module (e.g. SIM card 225_1~225_N of FIG. 1). In one embodiment of the present invention, the cellular module 221 performs at least a portion of functions of the control unit 1030. For example, the cellular module 221 may perform at least a portion of a multimedia control function.

The communication module 1010 exchanges information with a base station via a wireless communication network. The communication module 1010 may connect to an IMS network (or LTE network) through a base station. The communication module 1010 may also connect to a 2G network (GERAN) or a 3G network (UTRAN) via a base station. That is, the electronic device 200 uses the communication module 1010 to selectively connect to the LTE network or a 2G/3G legacy network for calls and data communication. The communication module 1010 sends a call setup request message through the IMS network, GERAN, or UTRAN, and receives a response through the IMS network. The communication module 1010 also sends and receives information needed to deliver a call service through the connected communication network.

The input unit 1020 receives a call request from the user. The call request may be one of a request for a voice call, a request for a video call, and a request for a supplementary service. The call request may be a request for a VoLTE call. Upon receiving a call request, the input unit 1020 notifies the call request to the control unit 1030.

The input unit 1020 may correspond to the input unit 250 of FIG. 2. That is, the input unit 1020 may include the touch panel 252, the pen sensor 254 (digital), the keys 256, and the ultrasonic inputter 258.

Upon receiving a call request, the control unit 1030 determines whether the call request is a request for a call via an IMS network, controls, when it is determined that the call request is a request for a call via an IMS network, the communication module 1010 to set up a call via the IMS network, and performs CSFB when the call setup via the IMS network is unsuccessful. The control unit 1030 may correspond to the processor 170 of FIG. 1 or the application processor (AP) 210 of FIG. 2.

When a call request is received through the input unit 1020, the control unit 1030 determines whether the call request is a request for a call via an IMS network (or LTE network) or via a 2G or 3G network. Here, a request for a call via an IMS network may be a request for a VoLTE service. If it is determined that the call request is a request for a call via an IMS network, the control unit 1030 controls the communication module 1010 to send an Invite message to the IMS network as an attempt to set up a call via the IMS network.

The control unit 1030 determines that call setup is unsuccessful when an error message is received from the IMS network or when no response is received from the IMS network for a given time or more.

Upon determining that call setup via the IMS network is unsuccessful, the control unit 1030 determines whether a CSFB condition is satisfied. Specifically, the control unit 1030 may determine that a CSFB condition is satisfied when the SIP error code in the error message received from the IMS network is related with "Internal Timeout", "Service Unavailable", or "Alternative Service". Here, errors corresponding to a CSFB condition may include network errors (e.g. 606 "Not Acceptable", 503 "Service Unavailable", 480 "Temporarily Unavailable", 404 "Not Found" or 488 "Not Acceptable Here"), and may be set differently or changed according to service providers or regional characteristics.

The control unit 1030 controls the communication module 1010 to send an attach request message to the MME and receives a corresponding attach accept message from the MME. In such a way, the control unit 1030 determines that the current network supports CSFB. Specifically, the control unit 1030 controls the communication module 1010 to send an attach request message with Combined EPS/IMSI Attach to the MME. Thereafter, when an attach accept message with Combined EPS/IMSI Attach is received through the communication module 1010 from the MME, the control unit 1030 determines that the current network supports CSFB.

Upon determining that the current network supports CSFB, the control unit 1030 performs CSFB by controlling the communication module 1010 to release the LTE network connection and connect to a 2G or 3G network.

In one embodiment of the present invention, the communication module 1010 sends an Extended Service Request message for CSFB to the MME under control of the control unit 1030. Upon receiving the Extended Service Request message, the MME sends a CSFB indication to the eNodeB. The communication module 1010 receives frequency information of a CS network for CSFB from the eNodeB and forwards the same to the control unit 1030. Here, the CS network may be one of the GERAN and the UTRAN. The control unit 1030 determines to perform CSFB to the CS network corresponding to the received frequency information.

In the event that the call request of the user is a request for a video call, when the frequency information received from the eNodeB indicates a GERAN frequency, the control unit 1030 performs a blind cell reselection to a UTRAN cell on the basis of system information received from the eNodeB. Here, the system information may be System Information Block 6 (SIB 6). A video call service cannot be delivered through a 2G network (GERAN) supporting only CS services. Hence, in the case of a user request for a video call, when frequency information of a 2G network (GERAN) is received from the eNodeB, the control unit 1030 performs a cell reselection to a UTRAN cell on the basis of UTRAN neighbor cell information carried by SIB 6 in spite of the frequency information received from the eNodeB.

According to an embodiment of the present invention, in the case of a user request for a call service via an LTE network (VoLTE call), when a call setup fails, the electronic device 200 automatically performs a CSFB operation and provides a call service through a 2G or 3G network, achieving stable delivery of a call service.

According to an embodiment of the present invention, the electronic device 200 may include an input unit 1020 configured to receive a call request from the user; a communication module 1010 configured to connect to a network via a base station (eNodeB); and a control unit 1030 configured to determine, upon receiving the call request, whether the call request is a request for a call via an IMS network, to control, when it is determined that the call request is a request for a call via an IMS network, the communication module 1010 to set up a call via the IMS network, and performing CSFB when the call setup via the IMS network is unsuccessful.

The control unit 1030 may determine that the call setup is unsuccessful when an error message is received from the IMS network or when no response is received from the IMS network for a given time or more.

Upon determining that the call setup via the IMS network is unsuccessful, the control unit 1030 may determine whether a CSFB condition is satisfied, determine, when the CSFB condition is satisfied, whether the current network supports CSFB, and conduct CSFB when the current network supports CSFB.

The control unit 1030 may determine that a CSFB condition is satisfied when the SIP error code in the error message received from the IMS network is related with "Internal Timeout", "Service Unavailable", or "Alternative Service".

The control unit 1030 may determine that the current network supports CSFB when an attach request message is sent to the MME through the communication module 1010 and a corresponding attach accept message is received from the MME.

Specifically, the communication module 1010 may send an Extended Service Request message to the MME and receive CS network frequency information for CSFB from the eNodeB having received a CSFB indication from the MME. Then, the control unit 1030 may conduct CSFB to a CS network corresponding to the frequency information.

Here, the CS network may be one of the GERAN and the UTRAN.

In the event that the call request from the user is a request for a video call, when the frequency information received from the eNodeB indicates a GERAN frequency, the control unit 1030 may perform a blind cell reselection to a UTRAN cell on the basis of system information received from the eNodeB.

After performing the CSFB, the electronic device 200 may make an attempt to set up a call via the CS network.

The above-discussed method is described herein with reference to flowchart illustrations of user interfaces, methods, and computer program products according to various embodiments of the present invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

Each block of the flowchart illustrations may represent a module, segment, or portion of code, which comprises one or more executable instructions for implementing the specified logical function(s). It should also be noted that in some alternative implementations, the functions noted in the blocks may occur in a different order. For example, two blocks shown in succession may in fact be executed substantially concurrently or the blocks may sometimes be executed in the reverse order, depending upon the functionality involved.

While the invention has been particularly shown and described with reference to certain embodiments thereof, it will be understood by those skilled in the art that various changes in form and details may be made therein without departing from the spirit and scope of the invention as defined by the appended claims and their equivalents.

What is claimed is:

1. A method of providing call services for an electronic device, the method comprising:

receiving a call request from a user;
determining whether the call request is a request for a call via an Internet Protocol (IP) Multimedia System (IMS) network;
making, when it is determined that the call request is a request for a call via an IMS network, an attempt to set up the call via the IMS network;
determining whether the attempt for the call setup via the IMS network is successful;
determining whether an error code of an error message received from the IMS network is a predetermined error code, when it is determined that the attempt for the call setup via the IMS network is unsuccessful; and
performing Circuit Switched Fallback (CSFB) if the error code is the predetermined error code,
wherein the predetermined error code corresponding to the CSFB is determined according to a service provider or a regional characteristic, and
wherein performing the CSFB further comprises:
if the call request is a request for a video call, performing a blind cell reselection to an Universal Mobile Telecommunications System (UMTS) Terrestrial Radio Access Network (UTRAN) cell on the basis of system information received from a base station (eNodeB) when frequency information received from the eNodeB indicates a Global System for Mobile communication (GSM) EDGE Radio Access Network (GERAN) frequency, and performing the CSFB to the UTRAN when frequency information received from the eNodeB indicates a UTRAN frequency.

2. The method of claim 1, wherein the call request is one of a request for a voice call, a request for a video call, and a request for a supplementary service.

3. The method of claim 1, wherein determining whether the attempt for the call setup via the IMS network is successful comprises determining that the attempt for the call setup is unsuccessful when the error message is received from the IMS network or when no response is received from the IMS network for a given time or more.

4. The method of claim 1, wherein performing the CSFB comprises:
determining whether a CSFB condition is satisfied;
determining whether a current network supports the CSFB; and
conducting the CSFB when it is determined that the current network supports the CSFB.

5. The method of claim 4, wherein determining whether the CSFB condition is satisfied comprises determining that the CSFB condition is satisfied when a Session Initiation Protocol (SIP) error code in the error message received from the IMS network is related with "Internal Timeout", "Service Unavailable", or "Alternative Service".

6. The method of claim 4, wherein determining whether the current network supports the CSFB comprises determining that the current network supports the CSFB when an Attach Request message is sent to a Mobility Management Entity (MME) and a corresponding Attach Accept message is received from the MME.

7. The method of claim 1, wherein performing the CSFB comprises:
sending an Extended Service Request message to an MME;
receiving frequency information of a circuit switched (CS) network for the CSFB from a the eNodeB having received a CSFB indication from the MME; and
carrying out the CSFB to the CS network corresponding to the frequency information.

8. The method of claim 7, wherein the CS network is one of a GERAN and a UTRAN.

9. The method of claim 1, wherein the system information is information on System Information Block 6 (SIB 6).

10. The method of claim 1, further comprising making, after performing the CSFB, an attempt to set up a call via a connected CS network.

11. An electronic device comprising:
an input unit configured to receive a call request from a user;
a communication module configured to connect to a network via a base station; and
a control unit configured to:
determine, upon receiving the call request, whether the call request is a request for a call via an Internet Protocol (IP) Multimedia System (IMS) network,
control, when it is determined that the call request is a request for a call via an IMS network, the communication module to set up the call via the IMS network,
determine whether the attempt for the call setup via the IMS network is successful,
determine whether an error code of an error message received from the IMS network is a predetermined error code, when it is determined that the attempt for the call setup via the IMS network is unsuccessful, and
perform Circuit Switched Fallback (CSFB) if the error code is the predetermined error code,
wherein the predetermined error code corresponding to the CSFB is determined according to a service provider or regional characteristic, and
wherein the control unit is further configured to:
if the call request is a request for a video call, reselect an Universal Mobile Telecommunications System (UMTS) Terrestrial Radio Access Network (UTRAN) cell through a blind cell reselection based on system information received from a base station (eNodeB) when frequency information received from the eNodeB indicates a Global System for Mobile communication (GSM) EDGE Radio Access Network (GERAN) frequency, and perform the CSFB to the UTRAN when frequency information received from the eNodeB indicates a UTRAN frequency.

12. The electronic device of claim 11, wherein the control unit is further configured to determine that the call setup is unsuccessful when the error message is received from the IMS network or when no response is received from the IMS network for a given time or more.

13. The electronic device of claim 11, wherein, when the call setup via the IMS network is unsuccessful, the control unit is further configured to determine whether a CSFB condition is satisfied, to determine whether a current network supports the CSFB, and to conduct the CSFB when it is determined that the current network supports the CSFB.

14. The electronic device of claim 13, wherein the control unit is further configured to determine that the CSFB condition is satisfied when a Session Initiation Protocol (SIP) error code in the error message received from the IMS network is related with "Internal Timeout", "Service Unavailable", or "Alternative Service".

15. The electronic device of claim 13, wherein the control unit is further configured to determine that the current network supports the CSFB when an Attach Request message is sent to a Mobility Management Entity (MME) through the communication module and a corresponding Attach Accept message is received from the MME.

16. The electronic device of claim 11, wherein the communication module is further configured to send an Extended Service Request message to an MME, and to receive frequency information of a circuit switched (CS) network for the CSFB from the base station having received a CSFB indication from the MME.

17. The electronic device of claim 16, wherein the CS network is one of a GERAN and a UTRAN.

18. The electronic device of claim 11, wherein, after performing the CSFB, the control unit is further configured to make an attempt to set up a call via a connected CS network.

19. The electronic device of claim 11, wherein the base station is an evolved Node B.

* * * * *